US007808767B2

(12) United States Patent
Kanno

(10) Patent No.: US 7,808,767 B2
(45) Date of Patent: Oct. 5, 2010

(54) CONTROL UNIT

(75) Inventor: Masayoshi Kanno, Kanagawa (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 12/046,967

(22) Filed: Mar. 12, 2008

(65) Prior Publication Data

US 2008/0238402 A1 Oct. 2, 2008

(30) Foreign Application Priority Data

Apr. 2, 2007 (JP) ............................ 2007-096608

(51) Int. Cl.
*H01G 5/04* (2006.01)

(52) U.S. Cl. ........................ 361/292; 307/157; 315/247

(58) Field of Classification Search ................. 323/354, 323/370; 361/271, 278, 280, 281, 292, 293; 307/109, 157, 204, 321; 315/224, 247, 305, 315/308, 360; 363/164, 165, 98

See application file for complete search history.

(56) References Cited

U.S. PATENT DOCUMENTS

| | | | | |
|---|---|---|---|---|
| 2,591,705 | A * | 4/1952 | Kodama | 361/293 |
| 3,668,478 | A | 6/1972 | Fabricius | |
| 4,009,607 | A * | 3/1977 | Ficken | 73/862.61 |
| 4,158,794 | A * | 6/1979 | Sandler | 315/169.1 |
| 5,084,801 | A * | 1/1992 | El-Hamamsy et al. | 361/277 |
| 5,600,187 | A * | 2/1997 | El-Hamamsy et al. | 307/157 |
| 5,715,155 | A * | 2/1998 | Shahani et al. | 363/132 |
| 6,472,962 | B1 * | 10/2002 | Guo et al. | 333/262 |

FOREIGN PATENT DOCUMENTS

| | | |
|---|---|---|
| DE | 43 12 195 A1 | 10/1994 |
| GB | 895304 | 5/1962 |
| JP | 2004-45133 | 2/2004 |
| JP | 2005-192409 | 7/2005 |
| JP | 2006-56060 | 3/2006 |

OTHER PUBLICATIONS

U.S. Appl. No. 12/276,734, filed Nov. 24, 2008, Kanno.

* cited by examiner

*Primary Examiner*—Rajnikant B Patel
(74) *Attorney, Agent, or Firm*—Oblon, Spivak, McClelland, Maier & Neustadt, L.L.P.

(57) ABSTRACT

A control unit includes an input terminal and an output terminal for a signal to be controlled, a control input terminal and a control output terminal for a control signal, variable capacitors connected in a bridge configuration between the input terminal and control input terminal, between the input terminal and control output terminal, between the control input terminal and output terminal, and between the control output terminal and output terminal, capacitances thereof being changed by the control signal, and a differential signal-controlled power source in which the control signal is applied across the control input terminal and control output terminal in a differential mode with a pair of signals having the same absolute value and mutually opposing polarities. Voltage or current of the signal to be controlled is controlled by the control signal changing the capacitances of the variable capacitors in the bridge configuration.

10 Claims, 10 Drawing Sheets

⇒

CONTROL UNIT

CROSS REFERENCES TO RELATED APPLICATIONS

The present invention contains subject matter related to Japanese Patent Application JP 2007-096608 filed in the Japanese Patent Office on Apr. 2, 2007, the entire contents of which being incorporated herein by reference.

BACKGROUND OF THE INVENTION

1. Field of the Invention

The present invention relates to a control unit suitably applied for controlling voltage or current in electrical equipment.

2. Description of the Related Art

Recently, convenience and efficiency of electronics technology has been highly evaluated, which accelerates electronic equipment technology represented by IT (information technology) and AV (audio visual) technology to be widely used on a global scale. On the other hand, the importance of the protection of global environment and limited earth resources has been pointed out. Thus, the development of an energy saving technology for such equipment has been desired greatly.

For example, efficiency in power supply of electronic equipment has been continuously improved, and some switching supply has achieved an efficiency of 90% or more. In reality, however, the power supply having low efficiency in view of cost or noise reduction is still used in many cases.

Also, even in the power supply having a high efficiency, the efficiency is affected by fluctuation of input power source voltage, component variation, and change of load current, and is decreased considerably in a low power operation, for example.

Although power supply efficiency is generally designed to be high at the rated load (power) of equipment, operation power continuously fluctuates in actual equipment and the efficiency thereof changes at the same time. In a television receiver, for example, the operation power thereof changes considerably according to an audio output level or a luminance level of the screen thereof. In other words, there exists an optimum input voltage for load current.

Further, the power supply efficiency becomes lower than a specified value thereof in an actual operation due to an effect of voltage fluctuation in a commercial power source. This may occur in any of switching regulators and series regulators.

For example, generally, a transformer has a no-load loss in an unloaded condition, and therefore the efficiency thereof is minimized in the unloaded condition and then increases along with the increase of a load current. However, a load loss is generated at the rate of the square of the load current and thus the load loss becomes a main factor of the entire loss, thereby decreasing the efficiency when the current exceeds a certain range.

In an actual transformerless power supply, one terminal of a commercial alternate current (AC) power source of 100 V, for example, is connected to one input terminal of a rectifying circuit composed of a diode bridge via a capacitor, and the other terminal of the commercial power source is connected to the other input terminal of the rectifying circuit. A zener diode for a constant voltage and a smoothing capacitor are connected in parallel between one and the other output terminals of the rectifying circuit.

Such a tranformerless power supply rectifies the commercial power source voltage directly and then uses a zener diode composing a regulator to provide a stable direct current (DC) voltage across the output terminals.

Here, the capacitor works for decreasing the voltage in advance and reducing the load of the zener diode composing the regulator.

A capacitor is frequently used for a small power. This is because a voltage drop by the capacitor may not cause a power loss, since the phase of current is shifted from that of voltage, and the capacitors are utilized for a power supply for standby power and the like, for example. In this circuit, however, the rectified output fluctuates according to load change and the like, and thus the circuit is generally configured to be optimized for the maximum load and to cause a power loss in the regulator at a light load so as to provide a stable voltage.

Also, the voltage drop across the capacitor changes considerably depending on a frequency or load current fluctuation. Therefore, the capacitor may not be used in equipment in which load current and load fluctuation are large, and the use thereof is currently limited to a micro-power application with a standby power of about several tens of milliwatts.

Also, in the transformerless power supply, it is possible to connect another predetermined capacitor to the capacitor in parallel using a relay or the like to increase the power supply when an operation accompanying a large power consumption is performed. However, a plurality of capacitors may need to be switched to cover a wide load range, although, in principle, it is possible to switch the plurality of capacitors with a relay or the like.

However, the power supply with switched capacitors may be slow in response in addition to requiring space and cost, and noise may be generated in the switching. Further, the capacitance may not be continuously changed in the power supply with switched capacitors, and the durability is low, and therefore it may not be put into practical use. Accordingly, it is desirable to have a device which can change the capacitance thereof continuously according to load change.

As a capacitor, the capacitance of which is electrically controllable, a varicap utilizing a capacitance across diode terminals is used for an application in a high frequency circuit, however, the varicap may not be used alone for power control because of a small capacitance value and a low withstand voltage.

Also, recently, a plurality of variable capacitors utilizing MEMS (micro-electromechanical system) is proposed. However, such capacitors may need to be used with a high frequency signal.

Generally, the capacitance of a capacitor is determined by a dielectric constant, an electrode area, and a distance between electrodes. Therefore, at least one factor among them may need to be controlled for controlling the capacitance. A method for controlling capacitance actually proposed using the MEMS is to change the inter-electrode distance or the facing electrode area by displacing the electrodes.

Japanese Unexamined Patent Application Publication No. S62-259417, for example, discloses an example of changing a dielectric constant of a ceramic capacitor by applying 50 V to change the capacitance thereof by 70%, and proposes an application thereof for making a cutoff frequency of a filter circuit or an oscillation frequency of an oscillator circuit with a time constant variable, for example.

SUMMARY OF THE INVENTION

As described hereinabove, power loss in electronic equipment and electronic circuits causes an increase of power consumption. Accordingly, the power loss not only makes users bear additional electricity expense, but also leads to waste of the earth resources and acceleration of global warming, and therefore the power loss is desired to be minimized.

In a series regulator method using a power transformer, which has a simplified circuit and low noise, voltage is first reduced to a required level by the power transformer connected to a commercial power source. Subsequently, the voltage is rectified in a diode and smoothed in a capacitor with a large capacitance. The rectified output may be unstable and therefore stabilized by a regulator which controls a voltage drop across transistor terminals.

In this case, the voltage drop is a DC voltage drop and basically converted entirely into heat, resulting in a large power loss. A necessary amount of the voltage drop is largely affected by variations in characteristics of components such as a power transformer and an amount of load current. Therefore, having a sufficient margin to operate electronic equipment stably causes the large power loss in a normal state, and makes the power efficiency decrease, in an extreme case, to about 30%.

Also, in a switching regulator method, voltage stabilization is performed by on/off control of a semiconductor element, and thus the power loss can be made less and the efficiency can be made higher. However, the efficiency still changes according to an input or load condition and deteriorates in a light load condition, and therefore the switching regulator method is desired to cope with a wider range of the input and load variation.

Also, the variable capacitor, disclosed in the patent reference 1, has a small capacitance and should have a higher control voltage, and therefore is not put to practical use for the power application. Further, since a control voltage for controlling the capacitance of the variable capacitor is superimposed on a signal to be controlled, another capacitor to cut off the superimposed voltage becomes necessary. In addition, with the variable capacitor alone, an adjustable range of the capacitance is narrow, and accordingly the cut-off frequency or the oscillation frequency of the oscillator circuit with a time constant has a narrow variable range.

The power control in electronic equipment unlike the frequency control may not require a precise capacitance value for each element. In the power control, a frequency range as low as around 300 kHz can be used widely and error detection can be performed using voltage or current, and thus a feedback control becomes easy.

The variable capacitor for the power control in electronic equipment has been described hereinabove, however, at present there exists no device that can be used practically.

Therefore, as a result of accumulated various researches, the present inventors proposed that a variable capacitor, having a necessary capacitance and withstand voltage and capable of DC voltage control, could be obtained by a combination of existing electronic components, without using a four-terminal device added with electrodes for a DC electric field as disclosed in Japanese Patent Application No. 2006-27322.

However, if the capacitance of the capacitor is made large for coping with large power, costs may be high and the size thereof may become large. Also, it is desired to have a wider variable range, a faster response, and a lower driving voltage for the performance thereof.

In view of these points, it is desirable to provide a control unit, in which a signal to be controlled can be controlled with a low power loss and low noise, and the capacitance can be increased, a capacitance variable range can be widened, and response can be improved while the size thereof is being reduced, for applications not limited to the power control.

According to an embodiment of the present invention, there is provided a control unit. The control unit includes an input terminal and an output terminal for a signal to be controlled, a control input terminal and a control output terminal for a control signal, variable capacitors connected in a bridge configuration between the input terminal and control input terminal, between the input terminal and control output terminal, between the control input terminal and output terminal, and between the control output terminal and output terminal while the capacitances thereof are changed by the control signal. The control unit further includes a differential signal-controlled power source in which the control signal is applied across the control input terminal and control output terminal in a differential mode with a pair of signals having the same absolute value and mutually opposing polarities, and voltage or current of the signal to be controlled is controlled by the control signal changing the capacitances of the variable capacitors in a bridge configuration.

According to an embodiment of the present invention, with a differential mode in which a control signal applied across a control input terminal and a control output terminal in a bridge-connected variable capacitor is a pair of signals having the same absolute value and mutually opposing polarities, a control voltage component generated at the input or output terminal always has zero potential and an effect of the control signal to the signal to be controlled can be eliminated almost perfectly.

Accordingly, by adding the bridge-connected variable capacitors with the control signal in a differential mode, it becomes possible to control the signal to be controlled stably without disturbing a performance of the signal to be controlled.

Also, by inserting the bridge-connected variable capacitors into the secondary side of the power transformer and applying the control signal in a differential mode, when the control voltage of the bridge-connected variable capacitors is increased, the output voltage is reduced, and thereby the power consumption can be reduced.

Also, by using the bridge-connected variable capacitors for a modulation circuit, it is possible to modulate an input signal by a variation of the control signal.

Also, by using the bridge-connected variable capacitors for adjusting a resonant frequency of a resonant circuit, an adjusting range of a capacitance of the bridge-connected variable capacitor is widened, and thereby it is possible to widen a variable adjusting range of an oscillation frequency.

BRIEF DESCRIPTION OF THE DRAWINGS

FIG. 1A shows a state of signal input and output and a state of control signal input and output, and FIG. 1B shows a state of AC signal input and output and a state of control signal input and output in a differential (±) mode.

FIG. 2A shows a state of AC signal input and output and control signal input and output in a differential (±) mode, FIG. 2B shows connections in the voltage-controlled variable capacitors in a bridge configuration. These figures are drawings to be used for describing an embodiment of the present invention.

FIG. 3A shows a state of AC signal input and output and control signal input and output in a differential (±) mode, and FIG. 3B shows connections in the voltage-controlled varicaps in a bridge configuration.

FIG. 4A is a perspective external view. FIG. 4B shows an inside configuration of the two-terminal variable capacitor array, and FIG. 4C shows an inside configuration of the two-terminal varicap array.

FIG. 6A shows an input signal (for a stabilizer) and an output signal (for a modulator), FIG. 6B shows an output signal (for the stabilizer) and an input signal (for the modulator), and FIG. 6C shows a control signal (for the stabilizer and the modulator).

FIG. 14A shows an LPF, FIG. 14B shows an HPF, and FIG. 14C shows a BPF.

DESCRIPTION OF THE PREFERRED EMBODIMENTS

Hereinafter, examples of a preferred embodiment for implementing a control unit of the present invention will be described with reference to the drawings.

Figure 1A:
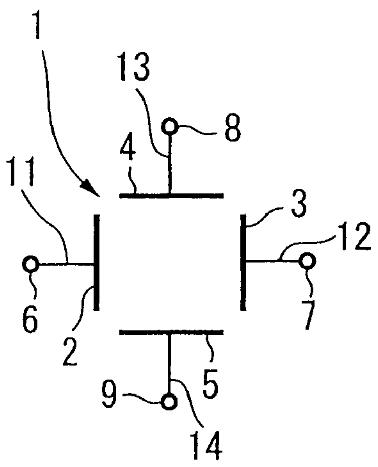
FIGS. 1A and 1B are schematic diagrams illustrating a voltage-controlled variable capacitor according to an embodiment of the present invention.
Figure 1B:
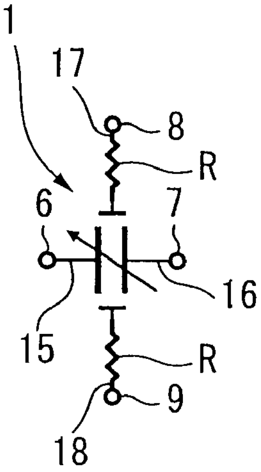

FIGS. 1A and 1B are schematic diagrams illustrating a voltage-controlled variable capacitor in the present embodiment. FIG. 1A shows a state of signal input and output, and control signal input and output. FIG. 1B shows a state of AC signal input and output, and control signal input and output in a differential (±) mode.

In FIG. 1A, a potential of the signal input 11 input to an input terminal 6 is supplied to an input electrode 2 of a voltage-controlled variable capacitor 1. Then, an electric field is generated between the input electrode 2 and an output electrode 3 of the voltage-controlled variable capacitor 1. By this electric field, a potential is generated at the output electrode 3, providing a signal output 12 to be output to an output terminal 7.

At this time, potentials of a control input 13 input to a control input terminal 8 and a control output 14 input to a control output terminal 9 are supplied to a control input electrode 4 and a control output electrode 5 of the voltage-controlled variable capacitor 1, respectively.

Then, a control signal provided by a potential difference between the control input electrode 4 and the control output electrode 5 of the voltage-controlled variable capacitor 1 changes capacitances of the voltage-controlled variable capacitors 1 between the input electrode 2 and the output electrode 3. Accordingly, an electric field is generated therein according to this changed capacitances and a potential of the signal input 11.

In FIG. 1B, a potential of an AC input 15 input to the input terminal 6 is supplied to the input electrode 2 of the voltage-controlled variable capacitor 1. Then, an electric field is generated between the input electrode 2 and the output electrode 3 of the voltage-controlled variable capacitor 1. By this electric field, a potential is generated at the output electrode 3, providing an AC output 16 to be output to the output terminal 7.

At this time, a plus potential of a control signal 17 input to the control input terminal 8 and a minus potential of a control signal 18 input to the control output terminal 9 are supplied to the control input electrode 4 and the control output electrode 5 of the voltage-controlled variable capacitor 1 via resistors R, respectively.

Then, the control signal provided by a potential difference between the plus potential and the minus potential of the control input electrode 4 and the control output electrode 5, respectively, of the voltage-controlled variable capacitor 1 changes a capacitances of the voltage-controlled variable capacitors 1 between the input electrode 2 and the output electrode 3. Accordingly, an electric field is generated therein according to this changed capacitances and a potential of the AC input 15.

Figure 2A:
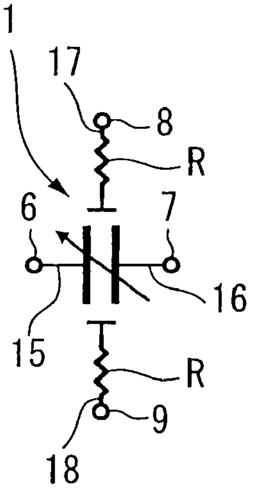
FIGS. 2A and 2B are diagrams illustrating voltage-controlled variable capacitors in a bridge configuration.
Figure 2B:
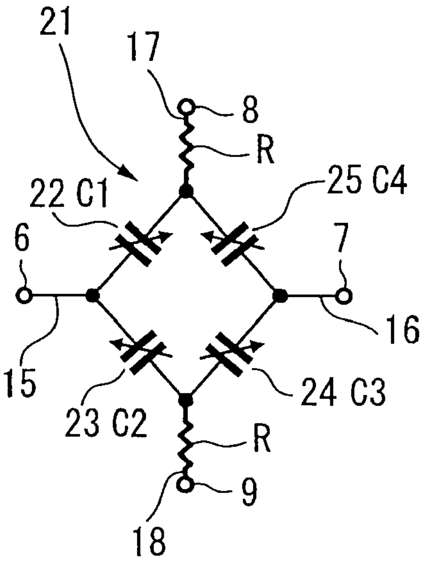

FIGS. 2A and 2B are diagrams illustrating voltage-controlled variable capacitors in a bridge configuration. FIG. 2A shows a state of AC signal input and output, and control signal input and output in a differential (±) mode. FIG. 2B shows a state of connections of the voltage-controlled variable capacitors in a bridge configuration.

FIG. 2A is the same as FIG. 1B and the description thereof will be omitted. In FIG. 2B, connections of the voltage-controlled variable capacitors 21 in the bridge configuration are as follows. A voltage-controlled variable capacitor 22 (C1) is connected between an input terminal 6 and a control input terminal 8, and a voltage-controlled variable capacitor 23 (C2) is connected between the input terminal 6 and a control output terminal 9.

Also, a voltage-controlled variable capacitor 25 (C4) is connected between the control input terminal 8 and an output terminal 7, and a voltage-controlled variable capacitor 24 (C3) is connected between the control output terminal 9 and the output terminal 7.

The input terminal 6 is connected between the voltage-controlled variable capacitor 22 (C1) and the voltage-controlled variable capacitor 23 (C2), and the output terminal 7 is connected between the voltage-controlled variable capacitor 25 (C4) and the voltage-controlled variable capacitor 24 (C3).

Also, the control input terminal 8 is connected between the voltage-controlled variable capacitor 22 (C1) and the voltage-controlled variable capacitor 25 (C4), and the control output terminal 9 is connected between the voltage-controlled variable capacitor 23 (C2) and the voltage-controlled variable capacitor 24 (C3).

In FIG. 2B, a potential of the AC input 15 input to the input terminal 6 is supplied between the voltage-controlled variable capacitor 22 (C1) and the voltage-controlled variable capacitor 23 (C2) of the voltage-controlled variable capacitors 21.

Then, an electric field is generated between electrodes of the voltage-controlled variable capacitor 22 (C1) and the voltage-controlled variable capacitor 23 (C2), as well as between electrodes of the voltage-controlled variable capacitor 25 (C4) and the voltage-controlled variable capacitor 24 (C3) of the voltage-controlled variable capacitors 21. By this electric field, a potential is generated at an output electrode 3, providing an AC output 16 to be output to the output terminal 7.

At this time, a plus potential of a control signal 17 input to the control input terminal 8 and a minus potential of a control signal 18 input to the control output terminal 9 are supplied to each electrode of the voltage-controlled variable capacitor 22 (C1) and the voltage-controlled variable capacitor 23 (C2), as well as to each electrode of the voltage-controlled variable capacitor 25 (C4) and the voltage-controlled variable capacitor 24 (C3) in the voltage-controlled variable capacitors 21 via the resistors R.

Then, a control signal provided by the plus potential and the minus potential between each electrodes of the voltage-controlled variable capacitor 22 (C1) and the voltage-controlled variable capacitor 23 (C2), as well as between each electrodes of the voltage-controlled variable capacitor 25 (C4) and the voltage-controlled variable capacitor 24 (C3) in the voltage-controlled variable capacitors 21, changes capacitances of the voltage-controlled variable capacitors 21 between each electrodes. Accordingly, an electric field is generated therein according to this changed capacitances and a potential of the AC input 15.

In thus bridge-connected voltage-controlled variable capacitors 21, the control signal is applied between the control terminals in a differential mode in which a pair of signals having the same absolute value and mutually opposing polarities are applied to the control terminals. Thereby, voltage components of the control signals 17 and 18 generated at the input and output terminals 6 and 7 are canceled by each other always to have a zero potential. Therefore, an effect thereof to each signal of the AC input 15 and the AC output 16 can be eliminated almost perfectly.

Accordingly, with a simple configuration of adding only the bridge-connected voltage-controlled variable capacitors 21 controlled in a differential mode, in which the control signals 17 and 18 have the same absolute value and mutually opposing polarities, it is possible to stabilize a voltage from the AC input 15 to be output to the AC output 16 without disturbing a performance of each signal of the AC input 15 and the AC output 16, and thereby to configure a stable power saving circuit.

Figure 3A:
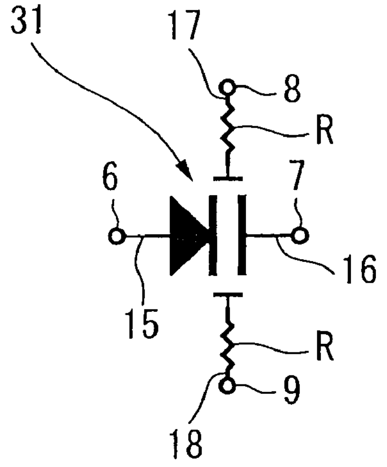
FIGS. 3A and 3B are diagrams illustrating voltage-controlled varicaps in a bridge configuration.
Figure 3B:
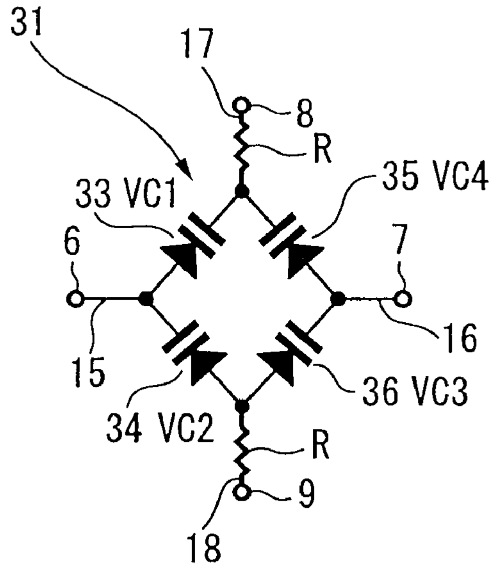

Instead of the voltage-controlled variable capacitors 21 in the bridge configuration described hereinabove, varicaps may be used in a bridge configuration. FIGS. 3A and 3B are diagrams illustrating a voltage-controlled varicap in a bridge configuration. FIG. 3A shows a state of AC signal input and output, and control signal input and output in a differential (±) mode. FIG. 3B shows a state of connections in the voltage-controlled varicaps in the bridge configuration.

In FIG. 3A, a potential of an AC input 15 input to an input terminal 6 is supplied to an anode electrode of the voltage-controlled varicap 31. Then, an electric field is generated between the anode electrode and a cathode electrode of the voltage-controlled varicap 31. By this electric field, a potential is generated at the cathode electrode, providing an AC output 16 to be output to an output terminal 7.

At this time, a plus potential of a control signal 17 input to a control input terminal 8 and a minus potential of a control signal 18 input to a control output terminal 9 are supplied to a control input electrode and a control input electrode of the voltage-controlled varicap 31 via resistors R.

Then, a control signal provided by the plus potential and the minus potential at the control input electrode and the control output electrode, respectively, of the voltage-controlled varicap 31 changes capacitances of the voltage-controlled varicap 31 between the anode electrode and the cathode electrode. Accordingly, an electric field is generated therein according to this changed capacitances and a potential of the AC input 15.

In FIG. 3B, connections in the voltage-controlled varicaps 31 in the bridge configuration are as follows. A voltage-controlled varicap 33 (VC1) is connected between an input terminal 6 and a control input terminal 8, and a voltage-controlled varicap 34 (VC2) is connected between the input terminal 6 and a control output terminal 9.

Also, a voltage-controlled varicap 35 (VC4) is connected between the control input terminal 8 and an output terminal 7, and a voltage-controlled varicap 36 (VC3) is connected between the control output terminal 9 and the output terminal 7.

The input terminal 6 is connected between the anode of the voltage-controlled varicap 33 (VC1) and the cathode of the voltage-controlled varicap 34 (VC2), and the output terminal 7 is connected between the anode of the voltage-controlled varicap 35 (VC4) and the cathode of the voltage-controlled varicap 36 (VC3).

Also, the control input terminal 8 is connected between the cathode of the voltage-controlled varicap 33 (VC1) and the cathode of the voltage-controlled varicap 35 (VC4), and the control output terminal 9 is connected between the anode of the voltage-controlled varicap 34 (VC2) and the anode of the voltage-controlled varicap 36 (VC3).

In FIG. 3B, a potential of an AC input 15 input to the input terminal 6 is supplied between the anode of the voltage-controlled varicap 33 (VC1) and the cathode of the voltage-controlled varicap 34 (VC2).

Then, an electric field is generated between electrodes of the voltage-controlled varicap 33 (VC1) and voltage-controlled varicap 34 (VC2), as well as between electrodes of the voltage-controlled varicap 35 (VC4) and voltage-controlled varicap 36 (VC3). By this electric field, a potential is generated at an output electrode 3, providing an AC output 16 to be output to the output terminal 7.

At this time, a plus potential of a control signal 17 input to the control input terminal 8 is supplied to the cathode of the voltage-controlled varicap 33 (VC1) and the cathode of the voltage-controlled varicap 35 (VC4) via a resistor R.

Further, minus potential of a control signal 18 input to the control output terminal 9 is supplied to each electrode of the anode of the voltage-controlled varicap 34 (VC2) and the anode of the voltage-controlled varicap 36 (VC3) via a resistor R.

Then, a control signal of a reverse voltage applied by the plus potential and the minus potential to the electrodes in each of the voltage-controlled varicap 33 (VC1) and voltage-controlled varicap 34 (VC2), as well as to the electrodes in each of the voltage-controlled varicap 35 (VC4) and voltage-controlled varicap 36 (VC3), changes capacitances of the voltage-controlled varicap 31 between the electrodes. Accordingly, an electric field is generated therein according to this changed capacitances and a potential of the AC input 15.

Figure 4A:
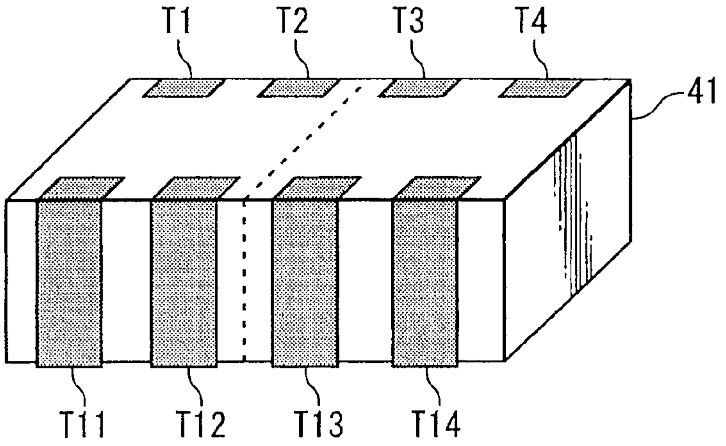
FIGS. 4A to 4C are diagrams illustrating a two-terminal variable capacitor array (varicap array).
Figure 4B:
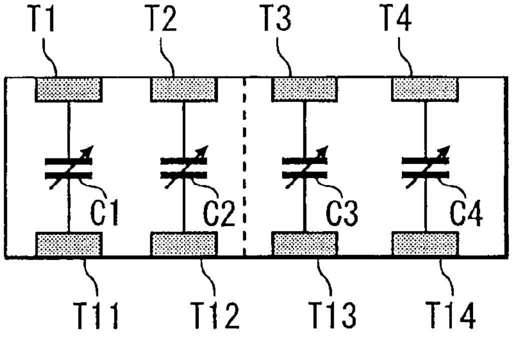
Figure 4C:
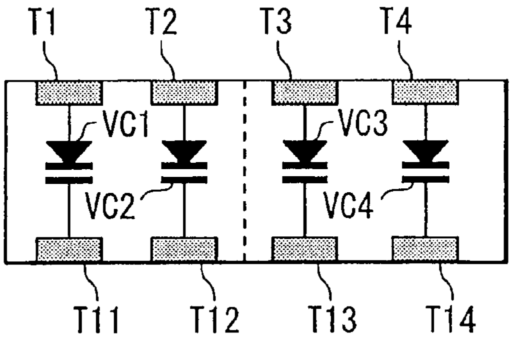

FIGS. 4A to 4C are diagrams illustrating a two-terminal variable capacitor array (varicap array). FIG. 4A is a perspective external view. FIG. 4B is a diagram showing an inside configuration of the two-terminal variable capacitor array, and FIG. 4C is a diagram showing an inside configuration of the two-terminal varicap array.

In FIG. 4A, the two-terminal variable capacitor array (varicap array) 41 is provided with only pairs of terminals T1 and T11, T2 and T12, T3 and T13, and T4 and T14 on the both lateral sides facing each other. The two-terminal variable capacitor array (varicap array) 41 may be configured by a combination of two or more elements, not limited to four elements, to simplify a terminal arrangement thereof.

In the two-terminal variable capacitor array shown in FIG. 4B, a variable capacitor C1 is provided between the pair of terminals T1 and T11, and a variable capacitor C2 is provided between the pair of terminals T2 and T12. Also, a variable capacitor C3 is provided between the pair of terminals T3 and T13, and a variable capacitor C4 is provided between the pair of terminals T4 and T14. The two-terminal variable capacitor array does not have a fixed direction and thereby production thereof is made simple.

For the variable capacitors C1 to C4 is used a laminated type, for example, in which electrical conducting material and dielectric material are laminated alternately. By application of a voltage (current), the capacitance thereof changes, and, at the same time, electrical charge (electrical energy) is stored therein according to the capacitance and the voltage thereof.

In the two-terminal varicap array shown in FIG. 4C, a varicap VC1 is provided between the pair of terminals T1 and T11 having a forward direction thereof (from the anode to the cathode), and a varicap VC2 is provided between the pair of terminals T2 and T12 having the forward direction.

Also, a varicap VC3 is provided between the pair of terminals T3 and T13 having the forward direction, and a varicap VC4 is provided between the pair of terminals T4 and T14 having the forward direction. Only a point that the two-terminal varicap array has a fixed direction of the forward direction (from the anode to the cathode) is to be taken into consideration in production.

Only by wiring the terminals of the two-terminal variable capacitor array (varicap array) 41 configured in this manner, it is possible to provide the voltage-controlled variable capacitors 21 in the bridge configuration shown in FIG. 2B and the voltage-controlled varicaps 32 in the bridge configuration shown in FIG. 3B.

Next, application examples will be described for the voltage-controlled variable capacitors 21 in the bridge configuration or the varicaps 32 in the bridge configuration configured as described hereinabove.

Figure 5:
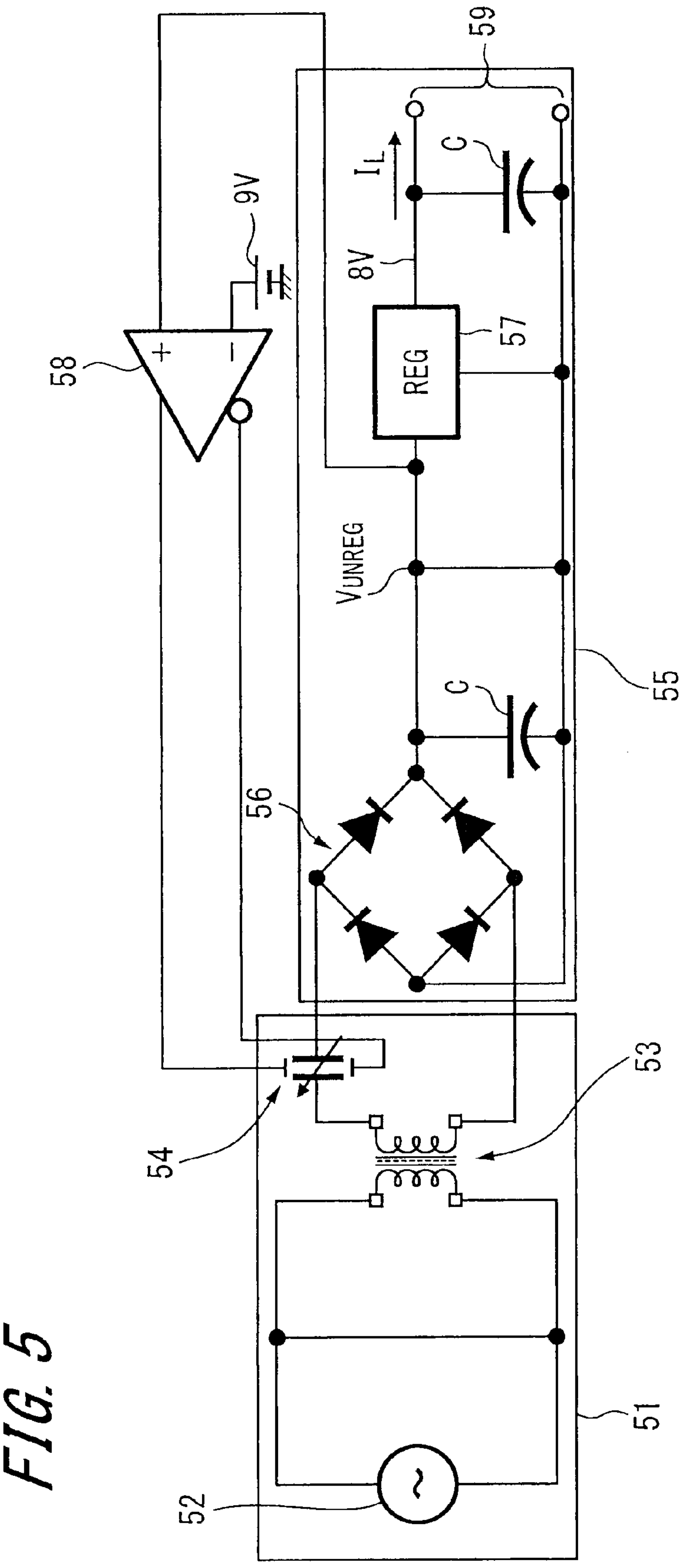
FIG. 5 is a diagram illustrating an example of an application for a stabilizer.

FIG. 5 is a diagram illustrating an example of an application to a stabilizer. FIG. 5 shows an example of series-regulator-type power-supply equipment. According to the example, the voltage-controlled variable capacitor 21 shown in FIG. 2B is applied to the secondary side of a power transformer 53 in an AC circuit 51. In FIG. 5, one terminal and the other terminal of an AC power source, an AC 100 V commercial power source 52, are connected to one terminal and the other terminal of the primary coil in the power transformer 53.

This power transformer 53 is configured to step-down the voltage of the commercial power source 52 into about AC 9 V. One terminal of the secondary coil of this power transformer 53 is connected to an input terminal of a stabilizer 54 and further connected to one input terminal of a rectifying circuit 56 composed of a diode bridge in a DC circuit 55 via an output terminal of the stabilizer 54.

A control signal input terminal (+) receiving a control signal to this stabilizer 54 is connected to a non-inverting output terminal of a differential amplifier circuit 58 constituting an error amplifier.

Also, a control signal input terminal (−) receiving a control signal to the stabilizer 54 is connected to an inverting output terminal of the differential amplifier circuit 58. In the present example, a differential control signal which applies a pair of signals having the same absolute value and mutually opposing polarities from the non-inverting output terminal and the inverting output terminal of the differential amplifier circuit 58 is supplied to the control signal input terminal (+) and the control signal input terminal (−) of the stabilizer 54.

The other terminal of the secondary coil in this power transformer 53 is connected to the other input terminal of the rectifying circuit 56 and a smoothing capacitor C is connected between one and the other output terminals of this rectifying circuit 56.

A DC voltage $V_{UNREG}$ smoothed by this rectifying circuit 56 and the smoothing capacitor C is supplied to one and the other DC voltage output terminals 59 via a three-terminal 8-V constant-voltage circuit (regulator) 57. The smoothing capacitor C is connected between these one and the other output terminals 59.

In the present example, the smoothed DC voltage $V_{UNREG}$ obtained at the output side of this rectifying circuit 56 is supplied to one input terminal of an operational amplifier 58 constituting the error amplifier. At the same time, the other input terminal of this operational amplifier 58 is grounded via a reference voltage, for example, a 9 V battery.

The power supply equipment shown in the example of FIG. 5 is configured as described above, and the smoothed DC voltage $V_{UNREG}$ on the output side of the rectifying circuit 56 is compared to the reference voltage by the operational amplifier 58. This comparison result is differentially amplified by the operational amplifier 58 capable of operating with a single power source, and is fed back to the control signal input terminal (+) and the control signal input terminal (−) of the stabilizer 54.

This stabilizer 54 controls the smoothed DC voltage $V_{UNREG}$ on the output side of the rectifying circuit 56 to become a stable 9 V of the reference voltage. Here, a power loss in the three-terminal constant-voltage circuit 57 is represented by the formula 1.

$$(V_{UNREG}-8)V\times I_L \qquad \text{Formula 1}$$

When the stabilizer 54 is not provided, the rectified output voltage $V_{UNREG}$ fluctuates in the range of $9\,V<V_{UNREG}<16\,V$. Providing the stabilizer 54, the rectified output voltage converges into a range of $9\,V<V_{UNREG}<9.4\,V$. Accordingly, an improvement in the power loss is represented by the formula 2.

$$(16-9.4)V\times I_L(I_L=0.26\text{ A}) \qquad \text{Formula 2}$$

When the stabilizer 54 of the present example is not provided to the example of FIG. 5, i.e., in existing power supply equipment, a rectified output voltage $V_{UNREG}$ from the output voltage of the power transformer 53 becomes 16 V at an input voltage of AC 100 V (IL=0.26 A). In this case, a design margin has to be taken into consideration, and thereby the power loss PW represented by the formula 3 is caused in the three-terminal constant-voltage circuit 57 at a maximum rating.

$$(16-8)V\times 0.26\,A=2.08\,W \qquad \text{Formula 3}$$

On the other hand, in the example of FIG. 5 where the stabilizer 54 of the present example is provided, the stabilizer 54 of the present example controls the output side voltage of the rectifying circuit 56 to become 9.0 V, and thereby the power loss PW in this case becomes as represented by the formula 4, after a design margin is taken into consideration.

$$(9.4-8)V\times 0.26\,A=0.364\,W \qquad \text{Formula 4}$$

Accordingly, in this example of FIG. 5, a great energy saving of about 1.7 W can be achieved.

Figure 7:
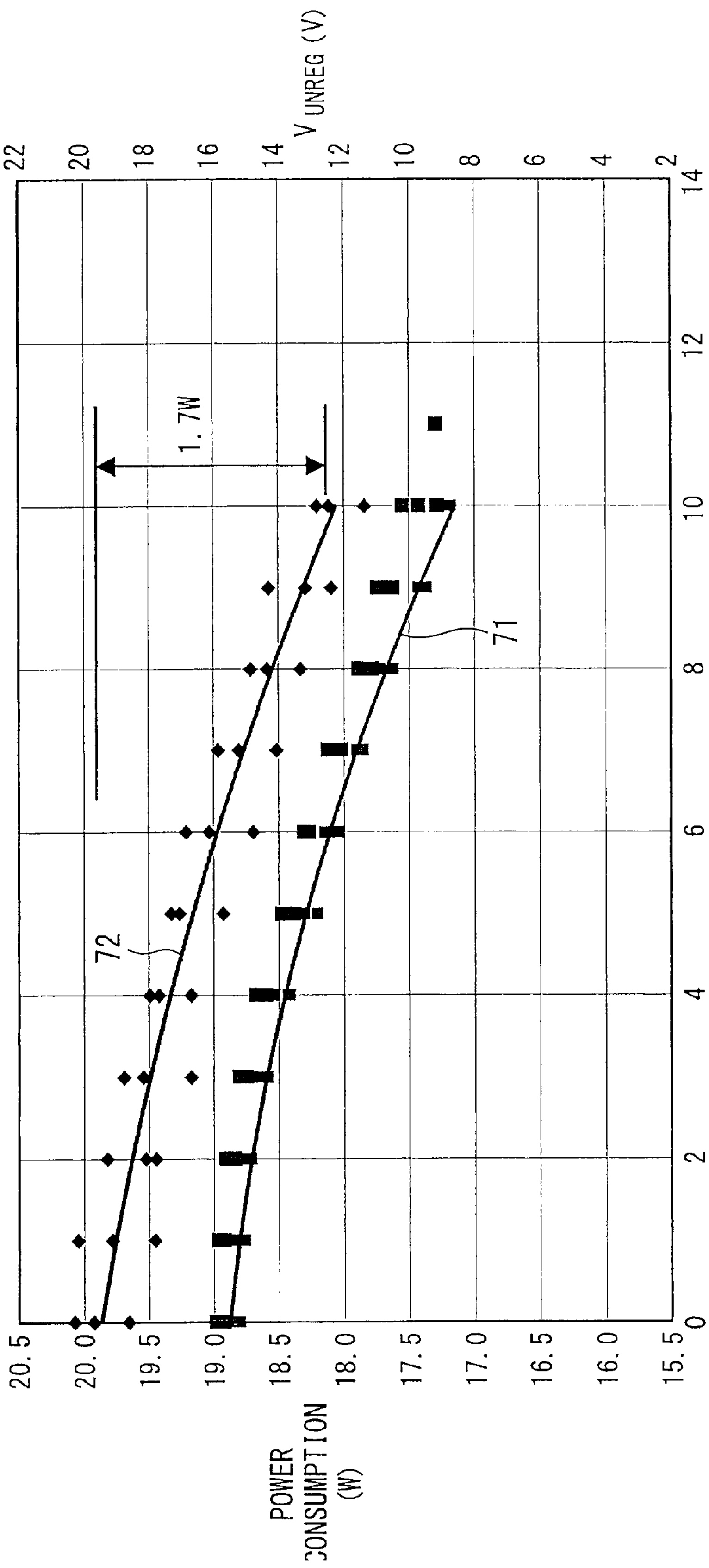
FIG. 7 is a graph showing a relationship between the control voltage and the power consumption.

FIG. 7 is a diagram showing a relationship between the control voltage and the power consumption. As shown in FIG. 7, when the control voltage of the stabilizer 54 represented by the horizontal axis is changed in a range of 0 to 10 V (0 to ±5 V) in peak to peak, the rectified output voltage $V_{UNREG}$ represented by the right vertical axis varies in a range of $9\,V<V_{UNREG}<16V$ as shown by a curve 71.

At this time, the power consumption represented by the left vertical axis can be reduced by 1.7 W as shown by a curve 72. The power consumption represented by the left vertical axis includes the power consumption of a system other than the control system shown in FIG. 5. For example, the controlling system shown in FIG. 5 is a motor driving system for electronic equipment, and the other system includes a CPU control system, a display system, etc.

Further, the reduction of the power consumption can eliminate a heat sink for heat dissipation and thereby provide an effect of saving space and cost.

Figures 6A, 6B, 6C:
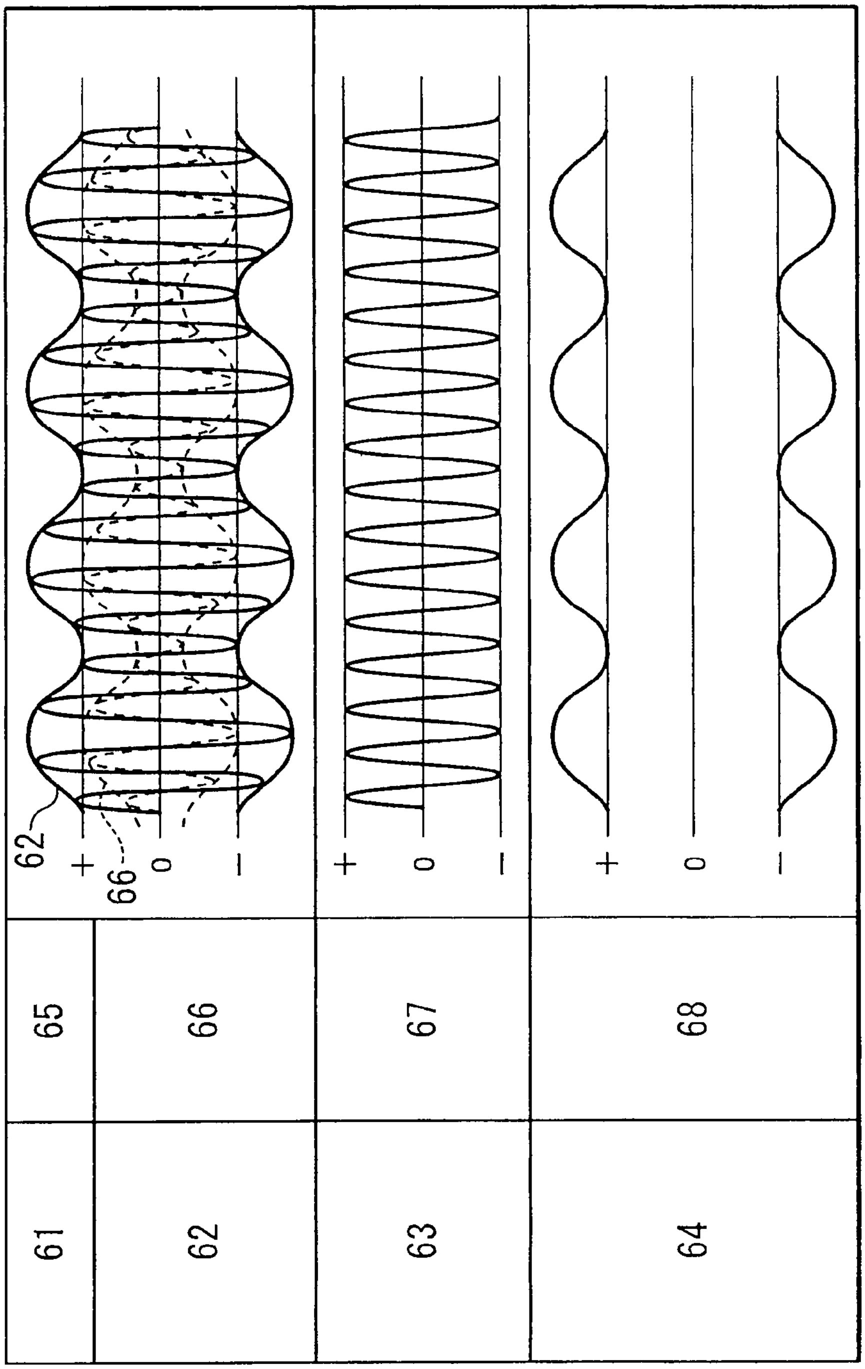
FIGS. 6A to 6C show signal waveform charts.

FIGS. 6A to 6C are signal waveform charts. FIG. 6A shows an input signal (for a stabilizer) and an output signal (for a modulator), FIG. 6B shows an output signal (for the stabilizer) and an input signal (for the modulator), and FIG. 6C shows a control signal (for the stabilizer and the modulator).

First, the waveforms for the stabilizer will be described, when the voltage-controlled variable capacitors 21 in the bridge configuration or the varicaps 32 in the bridge configuration are applied as the stabilizer as shown in FIG. 5. The input signal 62 shown in a stabilizer case 61 of FIG. 6A is an alternate signal on which variations in the plus and minus directions are superimposed.

An inverted output of the control signal 64 shown in FIG. 6C, for example, is supplied to the stabilizer 54 shown in FIG. 5. Thereby, the variations in the plus and minus directions of the input signal 62 shown in FIG. 6A can be cancelled.

That is, the input signal 62 shown in the stabilizer case 61 of FIG. 6A is stabilized by the stabilizer 54 shown in FIG. 5. As a result, the variation in the plus and minus directions of the input signal 62 is eliminated and the output signal becomes the output signal 63 shown in the stabilizer case 61 of FIG. 6B. Here, the signal level of the output signal 63 becomes lower than that of the input signal 62.

Next, the waveforms for the modulator will be described, when the voltage-controlled variable capacitors 21 in the bridge configuration or the varicaps 32 in the bridge configuration are applied as the modulator as shown in FIG. 5. The input signal 67 shown in a modulator case 65 of FIG. 6B is an alternate signal without variation in the plus and minus directions.

The control signal 68 shown in FIG. 6C, for example, is supplied to the modulator having the same configuration as that of the stabilizer 54 shown in FIG. 5. Thereby, variations in the plus and minus directions are superimposed on the input signal 67 shown in FIG. 6B.

That is, the input signal 67 shown in the modulator case 65 of FIG. 6B is amplitude-modulated in amplitude, corresponding to the variations in the plus and minus directions of the control signal 68, by the modulator having the same configuration as that of the stabilizer 54 shown in FIG. 5. AS a result, the alternate signal superimposed with the variations in the plus and minus directions becomes the output signal 66 shown in the modulator case 65 of FIG. 6A. Here, the signal level of the output signal 66 becomes lower than that of the input signal 67.

Next, another application example will be described for a case in which a resonant circuit composed of the variable capacitors in the bridge configuration and a coil is resonated at a resonant frequency.

Figure 8:
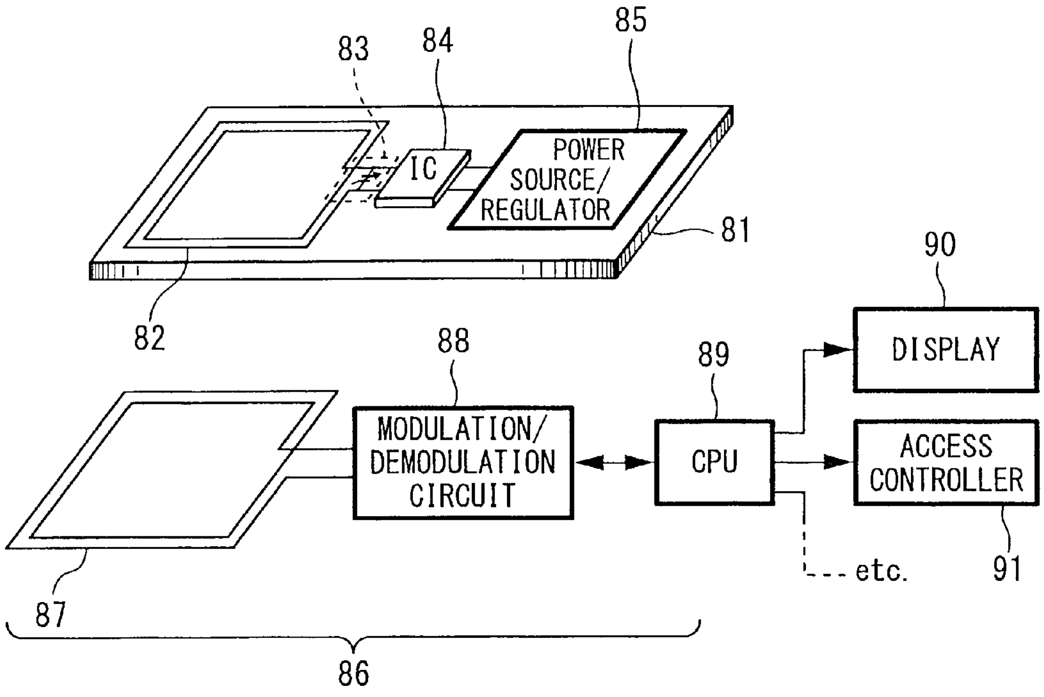
FIG. 8 is a diagram illustrating a non-contact card system.

FIG. 8 is a diagram illustrating a non-contact card system. Here is shown an example of application for a capacitance adjusting part of an antenna unit in a non-contact IC card.

As shown in FIG. 8, this non-contact card system includes an IC card 81 corresponding to a commuter pass, for example, and a reader/writer 86 which supplies power as a power source for the IC card 81 in a non-contact manner with an electromagnetic wave as a medium and also performs read/write of data or other necessary processing.

The reader/writer 86 radiates an electromagnetic wave carrying a signal of a command and, if necessary, write data, from a loop coil 87 having a rectangular shape, for example, in the cross section thereof and also radiates the electromagnetic wave without modulation for a certain period. First, a CPU 89 controls a modulation/demodulation circuit 88 to apply a voltage corresponding to a predetermined modulated wave to the loop coil 87 according to a predetermined program.

A modulation circuit performing modulation processing in the modulation/demodulation circuit 88 includes a carrier generator generating a carrier of a predetermined frequency, for example, (e.g., 14 MHz), and a driving circuit (amplifier), the gain of which changes according to the control of the CPU 89. The carrier is input into the driving circuit from the carrier generator.

The driving circuit further includes an adder which adds, with weights, detected voltages of the connecting points of secondary coils and capacitors in each of a plurality of loop antennas 87. The gain of the driving circuit is controlled by the CPU 89 corresponding to the command or the write data to be transmitted to the IC card 81. Accordingly, in the driving circuit, the carrier is amplitude-modulated and output according to the command or the write data to be transmitted to the IC card.

Output terminals of the driving circuit are connected to the coil (loop coil) 87 which works as the antenna (loop antenna). The amplitude-modulated wave output from the driving circuit is thus supplied to the loop coil 87. That is, a voltage corresponding to the amplitude-modulated wave is applied to the loop coil 87. Thereby, in the loop coil 87, a current corresponding to the voltage flows and a magnetic flux (magnetic field) corresponding to a change of the current is generated.

As a result, the amplitude-modulated wave output from the driving circuit is radiated as an electromagnetic wave from the loop coil 87.

Subsequently, in the reader/writer 86, the CPU 89 controls the gain of the driving circuit to have a constant value. Thereby, the non-modulated wave is radiated as an electromagnetic wave as same as the amplitude-modulated wave described above.

Then, whether the IC card 81 has responded or not is determined. Here, whether the IC card 81 has responded or not is determined as follows. That is, in the IC card 81 not shown in FIG. 8, a resonant circuit is configured by a loop coil 87 and a capacitor (resonant capacitance) connected in parallel, for example.

Further, to the capacitor, a serial circuit, that connects a capacitor and a switch (e.g. FET or the like) in series, is connected in parallel. Accordingly, depending upon off or on of the switch, the resonant circuit is composed of the loop coil and the capacitor, or the loop coil, and other capacitor, and the resonant frequency (impedance) thereof changes.

In the IC card 81 shown in FIG. 8, when responding to the reader/writer 86, a control signal that makes the capacitance of a voltage-controlled variable capacitor 83 variable is switched on/off. Thereby, the resonant frequency (impedance) is changed in a resonant circuit composed of the loop coil 82 and the voltage-controlled variable capacitor 83.

In this case, the IC card 81 and the reader/writer 86 are assumed to be within a distance where the loop coils 82 and 87 can cause a mutual induction. Here, the capacitance of the capacitor connected to the resonant circuit in the IC card 81 may be changed by a switch as same as in the reader/writer 86.

Impedance of the loop antenna 87 seen from the connecting points of the driving circuit and the loop coil 87 (terminals of the loop coil) in the reader/writer 86 radiating the electromagnetic wave corresponding to the non-modulated wave as described above, changes corresponding to the switch on/off in the IC card 81.

Accordingly, the voltage at the connecting point of the loop antenna 87 also changes. This voltage is detected and demodulated by the modulation/demodulation circuit 88 and supplied to the CPU 89. Whether the IC card 81 has responded or not is determined in the CPU 89 on the basis of a signal (demodulated signal) from the modulation/demodulation circuit 88.

When the CPU 89 determines that the IC card 81 has not responded, the processing of radiating the amplitude-modulated wave and the non-modulated wave as described above is repeatedly performed until the IC card 81 responds. Here, the case where it is determined that the IC card 81 has not responded is the case where the IC card 81 and the reader/writer 86 are not in the distance where the loop coil 82 and the loop coil 87 can cause the mutual induction.

On the other hand, when it is determined that the IC card 81 has responded, necessary processing is performed on the basis of the demodulation signal, which is obtained as the response as described above, from the modulation/demodulation circuit 88.

That is, in the case where the non-contact card system of FIG. 8 is an automatic ticket gate system, for example, the CPU 89 controls a display 90, an access controller 91, and other apparatuses. The display 90 exhibits a necessary display and, at the same time, the access controller 91 opens or closes a door (not shown in the drawing). Further, predetermined processing is performed in the other apparatuses.

Next, there will be described the IC card 81 shown in FIG. 8. The IC card 81 first receives the electromagnetic wave from the reader/writer 86. That is, when the IC card 81 comes close to the reader/writer 86, the loop coils 82 and 87 come within a distance to cause the mutual induction. Then, the loop coil 82 generates a counter electromotive force according to the change of a magnetic flux (change of a magnetic field) crossing the loop coil 82 of the electromagnetic field (magnetic flux) radiated from the loop coil 87.

Figure 9:
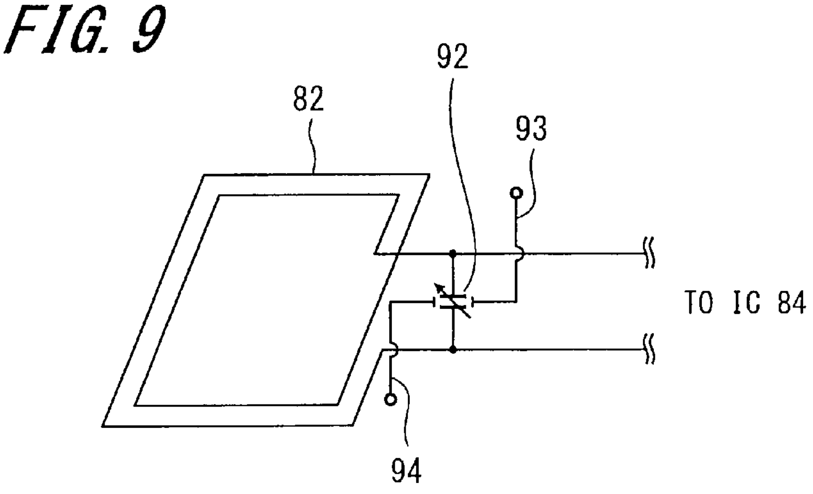
FIG. 9 is a diagram showing an example of an application for an antenna resonant circuit of an IC card.

FIG. 9 is a diagram illustrating an application example of the resonant circuit of the IC card antenna.

Here, in the IC card 81, as shown with the voltage-controlled variable capacitor 83 in FIG. 8, the loop coil 82 is connected in parallel with the voltage-controlled variable capacitor 92, and thereby constitutes the resonant circuit as shown in FIG. 9.

Accordingly, a voltage component, which has frequency components within a predetermined frequency band with the resonant frequency of the resonant circuit as its center, is supplied efficiently to an IC 84 at a subsequent stage among the voltage generated in the loop coil 82. The resonant circuit is composed of the loop coil 82 and the voltage-controlled variable capacitor 83.

The resonant frequency of the resonant circuit composed of the loop coil 82 and the voltage-controlled variable capacitor 83 is configured to be the same as the carrier frequency generated by the carrier generator of the reader/write 86, for example.

Then, an IC 84 starts to be supplied with power by the counter electromotive force based on the mutual induction as described above. Subsequently, the signal is detected after having passed through the resonant circuit composed of the loop coil 82 and the voltage-controlled variable capacitor 83.

That is, the signal, having passed through the resonant circuit composed of the loop coil 82 and the voltage-controlled variable capacitor 83, is rectified and smoothed (ripple is eliminated) via a rectifying/detecting diode and a smoothing capacitor (not shown in the drawing), and supplied to a power supply regulator 85. Then, the power supply regulator 85 stabilizes the input signal to have a predetermined constant voltage, and this voltage is supplied to the IC 84 for the power source thereof.

After the IC 84 has been supplied with power and become to be able to operate as described above, the signal, having passed through the resonant circuit composed of the loop coil 82 and the voltage-controlled variable capacitor 83, is detected via the rectifying/detecting diode described above. Further, the DC component of the signal is eliminated via a capacitor for AC coupling (not shown in the drawing), and the AC component of the signal is supplied to the IC 84.

The IC 84 interprets a command included in the input signal and performs processing corresponding to the command. That is, when the command requests write-in, for example, data (write data) included in the input signal is written into a memory not shown (for example, non-volatile memory and the like).

Also, when the command requests read-out, for example, data is read out from the memory. Corresponding to the data, a control signal (+) 93 and a control signal (−) 94 of the voltage-controlled variable capacitor 83 control the variable capacitance. The pair of control signal (+) 93 and control signal (−) 94 is a differential signal which provides a pair of signals having the same absolute value and mutually opposing polarities.

Hence, the control signal (+) 93 and the control signal (−) 94 are switched on/off depending on the control of the IC 84. For, example, the control signal is normally in the off state where the capacity of voltage-controlled variable capacitor 83 is relatively large. When the control signal (+) 93 and the control signal (−) 94 are switched to the on state, the capacity of voltage-controlled variable capacitor 83 is reduced to have a relatively small value.

Accordingly, the parallel resonant circuit composed of the loop coil 82 and the voltage-controlled variable capacitor 83 is resonated at the resonant frequency. Thereby, as described above, the voltage at the connecting point of the loop antenna 87 in the reader/writer 86 also changes corresponding to the read out data.

The resonant circuit composed of the loop coil 82 and the voltage-controlled variable capacitor 83 may be connected in parallel with a capacitor via a switch to perform a variable control of capacitance, and thus the parallel resonant circuit may be resonated at different resonant frequency.

In FIG. 8, while the IC card 81 is not provided with a power source and receives power supply from the reader/writer 86, it is possible to provide a power source to the IC card 81 itself.

For example, when the IC card 81 is used being attached to a mobile electronic device such as a mobile phone, the power supply of the mobile electronic device can be shared.

Meanwhile, there is a case where the capacitance of the loop antenna 82 is changed by the attachment of the loop antenna 82 to the IC card 81 in a production process or by the attachment of the IC card 81 to a mobile phone. Also, when the resonant circuit is connected in parallel with the capacitor via the switch, the capacitor is formed by sandwiching the front and rear surfaces of a card substrate with conductive materials using part of the loop antenna 82. Therefore, a change in an environment may change the capacitance of this capacitor by causing expansion or compression of the card substrate material.

Accordingly, there may be a change in the resonant frequency of the parallel resonant circuit composed of the loop coil 82 and the voltage-controlled variable capacitor 83. Therefore, it is assumed that a communication between the IC card 81 and the reader/writer 86 would be interrupted or may be impossible.

Thus, the capacitance change in the production process is adjusted by the control of the voltage-controlled variable capacitor 83. That is, the control signal (+) 93 and the control signal (−) 94 control the variable capacitance of the voltage-controlled variable capacitor 83. The capacitance change caused by the environment change is also adjusted for the voltage-controlled variable capacitor 83.

The pair of control signal (+) 93 and control signal (−) 94 is a differential signal which provides a pair of signals having the same absolute value and mutually opposing polarities. Thereby, the resonant frequency of the resonant circuit composed of the loop coil 82 and the voltage-controlled variable capacitor 83 is adjusted to an appropriate value capable of exchanging communications between the IC card 81 and the reader/writer 86.

Figure 10:
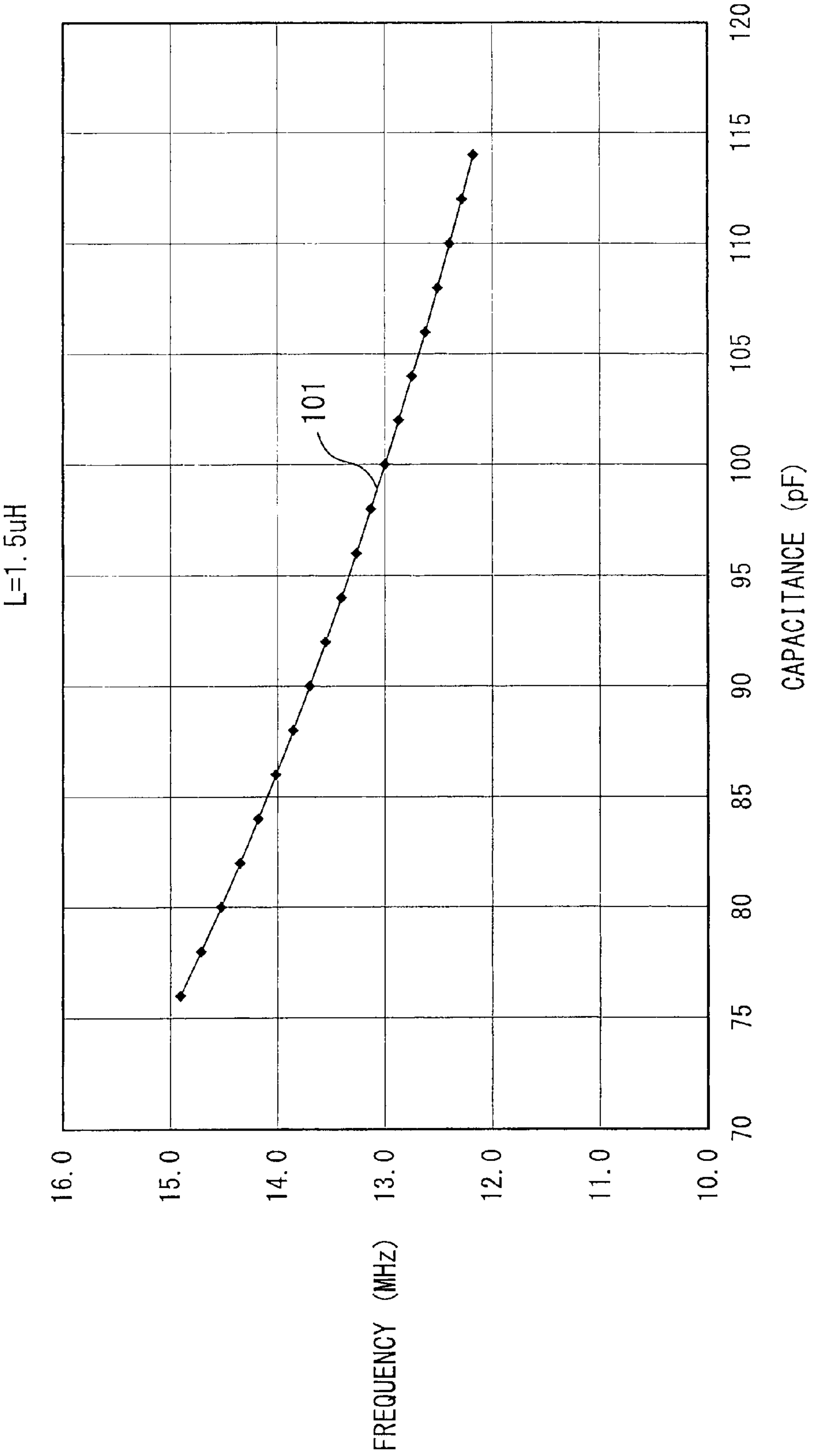
FIG. 10 is a graph showing a relationship between the capacitance and the resonant frequency in the IC card.

FIG. 10 is a graph showing a relationship between the capacitance of the IC card and the resonant frequency.

In FIG. 10, when the capacitance of the voltage-controlled variable capacitor 83 represented by the horizontal axis is changed in a range of 76 pF to 114 pF as shown by a curve 101, the resonant frequency represented by the vertical axis can be changed in a range of 14.9 MHz to 12.2 MHz.

For example, when the resonant frequency is set to be 14 MHz for the communication between the IC card 81 and the reader/writer 86, the capacitance of the voltage-controlled variable capacitor 83 is required to be 86 pF.

The capacitance change by the environment change is small and a capacitance range to be adjusted would be 86 pF plus and minus several pico-farads, for example. Also, in order to switch on the communication, for example, the capacitance needs to be reduced from a comparatively large value for the off state to a relatively small value for the on state. This requires a variable capacitance range of 86 pF plus twenty and several pico-farads.

Figure 11:
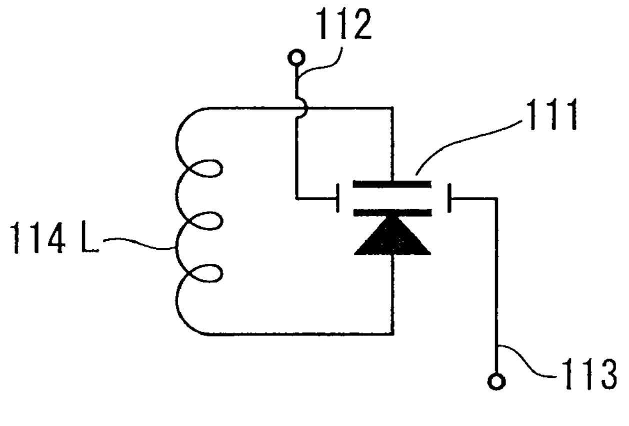
FIG. 11 is a diagram exemplarily showing an application of the voltage-controlled varicap for a resonant circuit.

FIG. 11 is a diagram exemplarily illustrating an application of a voltage-controlled varicap to a resonant circuit. Here, an example of an application of a voltage-controlled varicap to a capacitance adjusting part of a resonant circuit will be described. The voltage-controlled varicap here is the voltage-controlled varicaps 32 in the bridge configuration shown in FIG. 3B.

In FIG. 11, this resonant circuit is configured with a coil 114 (L) and the voltage-controlled varicap connected in parallel. A resonant frequency of this resonant circuit is determined by the inductance L of the coil 14 (L) and a static capacitance C of the voltage-controlled varicap 111. At this time, the resonant frequency f is provided by the formula 5.

$$f=1/\{2\pi\sqrt{(LC)}\} \quad \text{Formula 5}$$

For obtaining the resonant frequency f, the variable capacitance of the voltage-controlled varicap 111 is controlled by a control signal (+) 112 and a control signal (−) 113. The pair of control signal (+) 112 and the control signal (−) 113 is a differential signal which provides a pair of signals having the same absolute value and mutually opposing polarities.

The control signal (+) 112 and the control signal (−) 113 are controlled according to a control of a controller (not shown in the drawing) to have a resonant state or a non-resonant state.

When the voltage-controlled varicap 111 is replaced by a single varicap with a configuration according to the related art, for example, it is necessary to apply a control voltage with a DC component to the anode side of the single varicap for changing the capacity thereof.

Thus, since the control voltage is superimposed on a voltage to be controlled, an additional capacitor is required to eliminate the superimposed DC component of the control voltage. Also, the single varicap alone covers a narrow variable range of the capacitance and it is necessary to use a combined capacitance of the varicap and an additional capacitor for a capacitive component of the resonant circuit.

When the voltage-controlled varicaps 111 in the bridge configuration is used for this resonant circuit, varicaps are connected in series and in parallel to increase a combined capacitance. The capacitance control over the increased combined capacitance provides a wider variable range of the capacitance.

Further, the capacitance of the voltage-controlled varicaps 111 in the bridge configuration is controlled by the control signal (+) 112 and the control signal (−) 113 in a differential mode. Thus, the control voltage is not superimposed on the voltage to be controlled, and therefore the additional capacitor becomes unnecessary.

Figure 12:
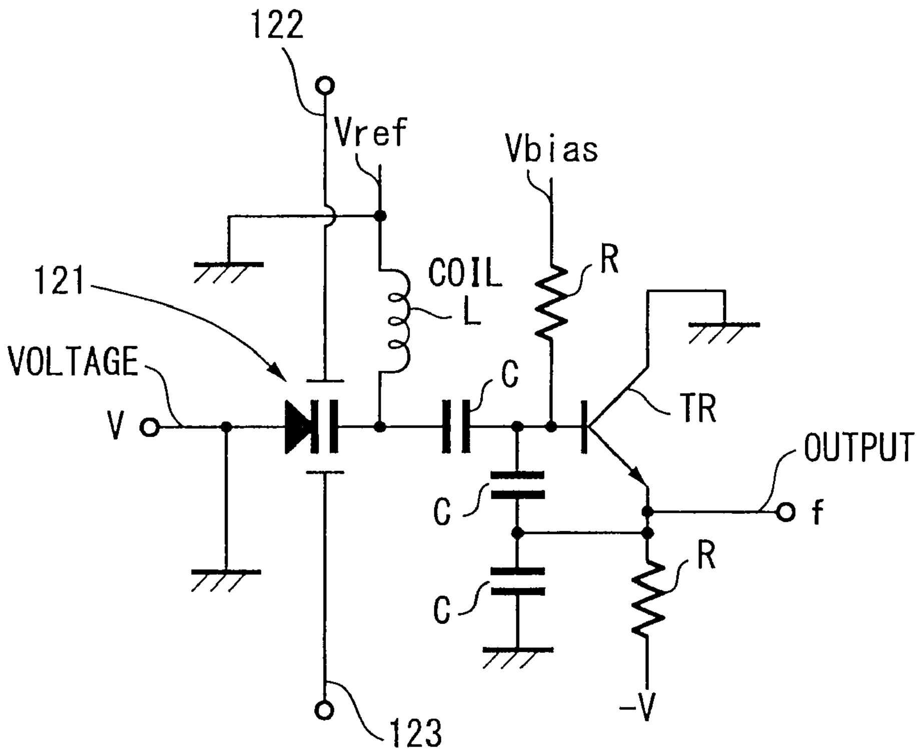
FIG. 12 is a diagram showing an example of a VCO circuit.

FIG. 12 is a diagram showing an example of a VCO circuit. Here, an application of a voltage-controlled varicap to a capacitance adjusting part for adjusting a resonant frequency in a voltage-controlled oscillator (VCO) will be exemplarily described. The voltage-controlled varicap here is the voltage-controlled varicap 32 in the bridge configuration shown in FIG. 3B.

The VCO is a circuit controlling an output frequency by a voltage. The input/output characteristics, i.e., characteristics of the output frequency against the input voltage, require monotone and linearity. More linear input/output characteristics provide more constant transmission characteristics and a simpler loop design.

Generally, a VCO using LC resonance characteristics has a low phase noise. This is because Q characteristics of an oscillation feedback system provide a large effect to the phase noise and an oscillation circuit using a system with a high Q has a low phase noise.

In FIG. 12, this example of the VCO circuit uses an LC resonant circuit, and is configured to change the capacitance C by a voltage applied by a control signal (+) 122 and a control signal (−) 123 in a differential mode using the voltage-controlled varicap 121 in the bridge configuration.

When a reverse bias voltage at both ends of the voltage-controlled varicap 121, supplied by the control signal (+) 122 and the control signal (−) 123, is smaller, the capacitance C becomes larger, and when the reverse bias voltage is larger, the capacitance C becomes smaller. This is because the capacitance C of the varicap is made of a depletion layer capacitance of a reverse biased PN junction.

When the voltage-controlled varicaps 121 in the bridge configuration are used for this VCO circuit, varicaps connected in series and in parallel increase the combined capacitance of the VCO circuit, and the capacitance control over the increased combined capacitance provides a wider variable range of the capacitance.

Further a control voltage is not superimposed on a voltage to be controlled, since the capacitance control of the voltage-controlled varicaps 121 in the bridge configuration is performed with the control signal (+) 112 and the control signal (−) 113 in a differential mode. Thereby, an additional capacitor becomes unnecessary and characteristics of the capacitance against the reverse voltage of the voltage-controlled varicaps 121 in the bridge configuration can be adjusted to cover a variable range of the capacitance satisfying an output frequency range of the VCO.

The static capacitance of the voltage-controlled varicaps 121 in the bridge configuration is changed by the change of the control voltage applied by the control signal (+) 112 and the control signal (−) 113 of the voltage-controlled varicaps 121.

Accordingly, the resonant frequency of the resonant circuit varies and thereby an oscillation frequency f output from an emitter of a transistor TR is changed. In the case of this circuit, the oscillation frequency f becomes higher as the control voltages of the control signal (+) 112 and the control signal (−) 113 of the voltage-controlled varicaps 121 in the bridge configuration increase.

Here, a voltage V, Vref, Vbias, a capacitor C, and a resistor R represent a voltage to be controlled in the resonant circuit, a reference voltage of the resonant circuit, a bias voltage of the transistor TR, a high frequency pass capacitor, and an additional resistor for reducing voltage drop of the transistor TR, respectively.

Figure 13:
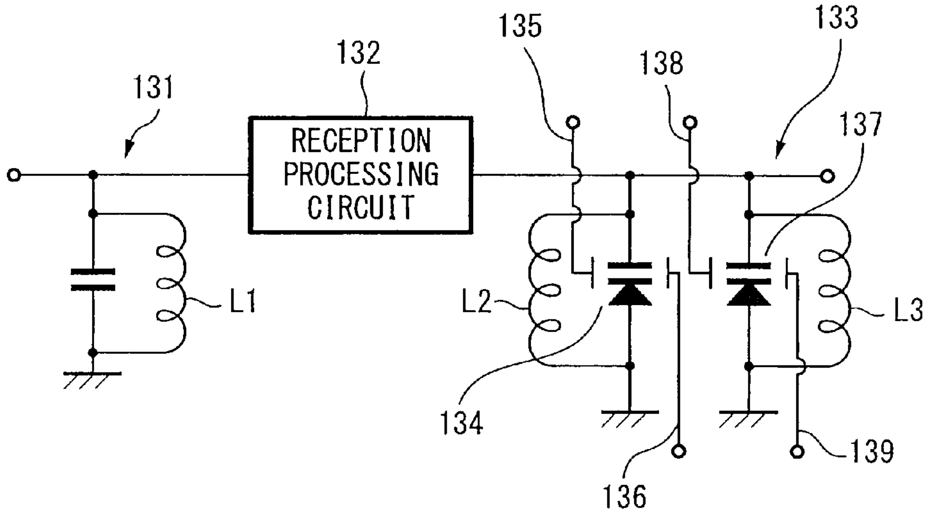
FIG. 13 is a diagram showing an example of a tuning circuit.

FIG. 13 is a diagram showing an example of a tuning circuit. Here, an application of the voltage-controlled varicap to a capacitance adjusting part for adjusting a resonant frequency of the tuning circuit is exemplarily described. The voltage-controlled varicap of this case is the voltage-controlled varicaps 32 in the bridge configuration shown in FIG. 3B.

In FIG. 13, a signal received by an antenna part 131 is subjected to a reception processing in a reception processing circuit 132. The signal subjected to the reception processing is tuned with a frequency selected by a tuner part 133. The tuner part 133 uses two resonant circuits, having a coil L2 and a voltage-controlled varicap 134 and having a coil L3 and a voltage-controlled varicap 137, respectively.

The capacitances C of the voltage-controlled varicaps 134, 137 in the bridge configuration can be changed by using control signals (+) 135, 138 and control signals (−) 136, 139 in a differential mode, respectively.

Thus, the capacitance of the resonant circuit composed of the coil L2 and the voltage-controlled varicap 134 and the capacitance of the resonant circuit composed of the coil L3 and the voltage-controlled varicap 137 are adjusted and the resonant frequencies of the resonant circuits can be made to become preset tuning frequencies.

Figure 14A:
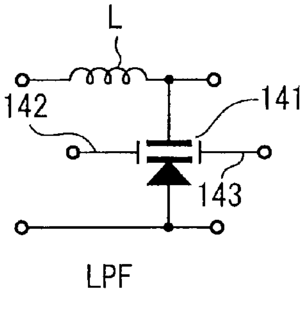
FIGS. 14A to 14C are diagrams showing examples of filter circuits.
Figure 14B:
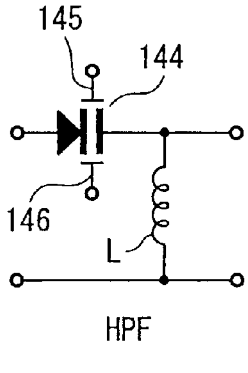
Figure 14C:
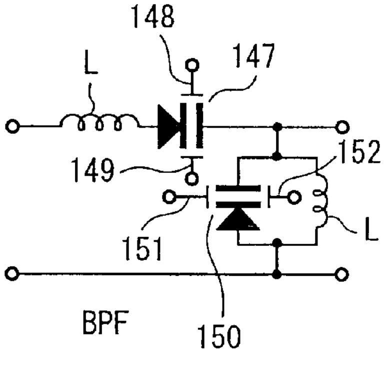

FIGS. 14A to 14C are diagrams showing examples of a filter circuit. FIG. 14A shows an LPF, FIG. 14B shows an HPF, and FIG. 14C shows a BPF. Here applications of a voltage-controlled varicap to capacitance adjusting parts for adjusting resonant frequencies of the filter circuits are exemplarily shown. The voltage-controlled varicaps of these cases are the voltage-controlled varicaps 32 in the bridge configuration shown in FIG. 3B.

In FIG. 14A, by use of the voltage-controlled varicaps 141 in the bridge configuration, the capacitance C can be changed by the control voltage provided by a control signal (+) 142 and a control signal (−) 143 in a differential mode. Thereby, a capacitance adjustment is performed for setting a cut-off frequency on the lower frequency side of the LPF using a resonant circuit composed of a coil L and the voltage-controlled varicap 141.

In FIG. 14B, by use of the voltage-controlled varicaps in the bridge configuration 144, the capacitance C can be changed by the control voltage provided by a control signal (+) 145 and a control signal (−) 146 in a differential mode. Thereby, a capacitance adjustment is performed for setting a cut-off frequency on the higher frequency side of the HPF using a resonant circuit composed of a coil L and the voltage-controlled varicap 144.

In FIG. 14C, by use of the voltage-controlled varicaps 147, 150 in the bridge configuration, the capacitances C can be changed by the control voltage provided by control signals (+) 148, 151 and control signals (−) 149, 152 in a differential mode. Thereby, capacitance adjustments are performed for setting cut-off frequencies on the lower frequency side and the higher frequency side of the BPF using two resonant circuits composed of a coil L and the voltage-controlled varicap 147 and another coil L and the voltage-controlled varicap 150, respectively.

It should be understood by those skilled in the art that various modifications, combinations, sub-combinations and alterations may occur depending on design requirements and other factors insofar as they are within the scope of the appended claims or the equivalents thereof.

What is claimed is:

1. A control unit, comprising:

an input terminal and an output terminal for a signal to be controlled;

a control input terminal and a control output terminal for a control signal;

variable capacitors in a bridge configuration connected between the input terminal and the control input terminal, between the input terminal and the control output terminal, between the control input terminal and the output terminal, and between the control output terminal and the output terminal, capacitances thereof being changed by the control signal; and a differential signal-controlled power source in which the control signal is applied across the control input terminal and the control output terminal in a differential mode with a pair of signals having the same absolute value and mutually opposing polarities, wherein voltage or current of the signal to be controlled is controlled by the control signal changing the capacitances of the variable capacitors in the bridge configuration.

2. The control unit according to claim 1, wherein the variable capacitors in the bridge configuration stabilize the signal to be controlled by canceling variation thereof with the control signal, the signal to be controlled being a secondary current of a transformer in a power supply circuit.

3. The control unit according to claim 1, wherein the variable capacitors in the bridge configuration modulate the signal to be controlled with variation of the control signal, the signal to be controlled being an input signal of a modulation circuit.

4. The control unit according to claim 1, wherein the variable capacitors in the bridge configuration resonate a resonant circuit at a resonant frequency, the resonant circuit including the variable capacitors in the bridge configuration and a coil.

5. The control unit according to claim 4, wherein the resonant circuit is used for a capacitance adjusting part of an antenna part in a non-contact IC card.

6. The control unit according to claim 4, wherein the resonant circuit is used for a capacitance adjusting part for adjusting a resonant frequency in a voltage-controlled oscillator.

7. The control unit according to claim 4, wherein the resonant circuit is used for a capacitance adjusting part of a tuner in a tuning circuit.

8. The control unit according to claim 4, wherein the resonant circuit is used for a capacitance adjusting part of a filter circuit.

9. The control unit according to claim 1, wherein varicaps in a bridge configuration are used instead of the variable capacitors in the bridge configuration.

10. The control unit according to claim 1, wherein the variable capacitors in the bridge configuration or the varicaps in a bridge configuration used instead of the variable capacitors in the bridge configuration is configured to have a bridge connection among terminals of a variable capacitor array having a plurality of two-terminal variable capacitors or a varicap array having a plurality of two-terminal varicaps.

* * * * *